(No Model.)  T. F. GAYNOR.  4 Sheets—Sheet 1.
ELECTRIC SIGNAL DEVICE.

No. 509,218.  Patented Nov. 21, 1893.

WITNESSES,
Frank Pardon,
Fred. McKenzie

INVENTOR,
Thomas F. Gaynor (No Model.) T. F. GAYNOR. 4 Sheets—Sheet 2.
ELECTRIC SIGNAL DEVICE.
No. 509,218. Patented Nov. 21, 1893.

WITNESSES,
Frank Pardon.
Fred McKenzie.

INVENTOR,
Thomas F. Gaynor (No Model.)

T. F. GAYNOR.
ELECTRIC SIGNAL DEVICE.

No. 509,218.   Patented Nov. 21, 1893.

4 Sheets—Sheet 3.

WITNESSES.
Frank Pardon,
Fred McKenzie

INVENTOR.
Thomas F. Gaynor (No Model.) 4 Sheets—Sheet 4.

T. F. GAYNOR.
ELECTRIC SIGNAL DEVICE.

No. 509,218. Patented Nov. 21, 1893.

WITNESSES.
Frank Pardon,
Fred McKenzie.

INVENTOR.
Thomas F. Gaynor.

UNITED STATES PATENT OFFICE.

THOMAS F. GAYNOR, OF LOUISVILLE, KENTUCKY, ASSIGNOR, BY MESNE ASSIGNMENTS, TO THE NEW GAYNOR ELECTRIC COMPANY, OF SAME PLACE.

ELECTRIC SIGNAL DEVICE.

SPECIFICATION forming part of Letters Patent No. 509,218, dated November 21, 1893.

Application filed March 16, 1891. Serial No. 385,300. (No model.)

*To all whom it may concern:*

Be it known that I, THOMAS F. GAYNOR, of Louisville, county of Jefferson, State of Kentucky, have invented an Improvement in Electric Signal Devices, of which the following description, in connection with the accompanying drawings, is a specification, like letters on the drawings representing like parts.

My invention relating to signal apparatus such as is employed for municipal telegraph purposes consists in novel details of construction and principles of operation that will be more fully described hereinafter.

Figure 1:
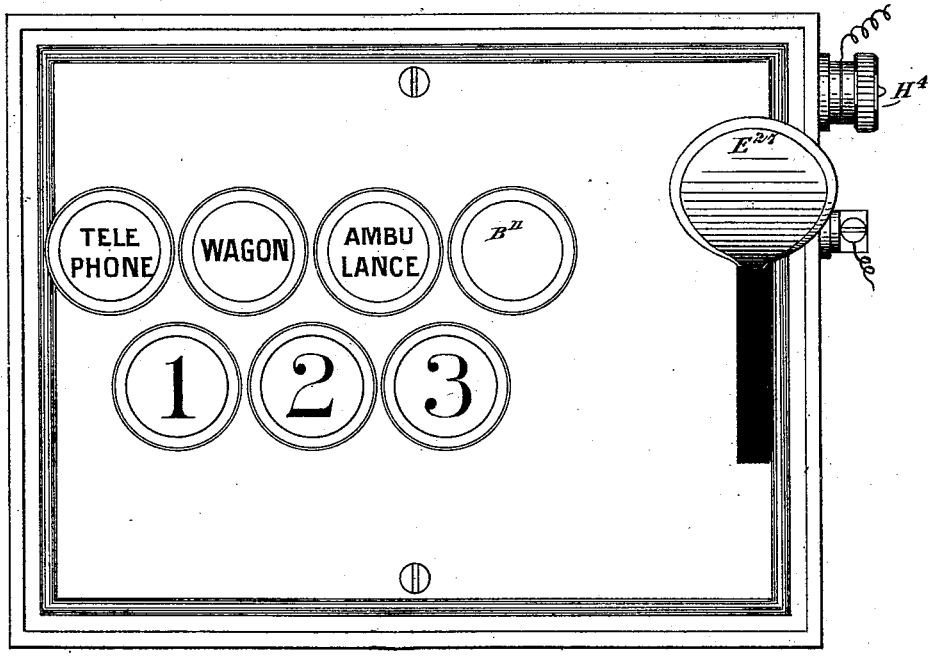
Figure 2:
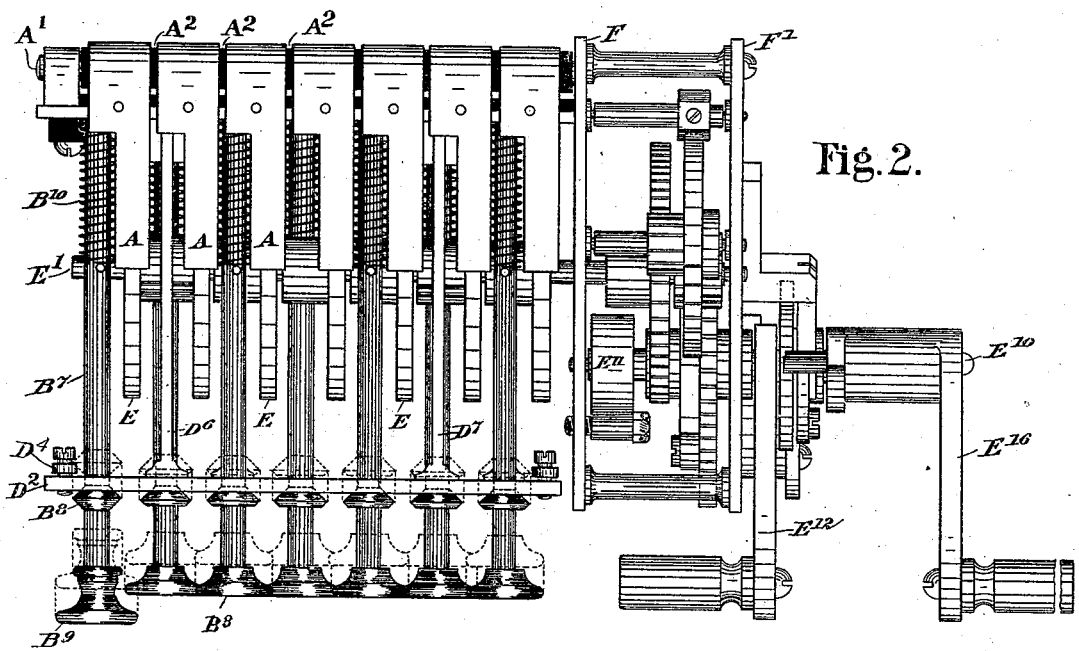
Figure 3:
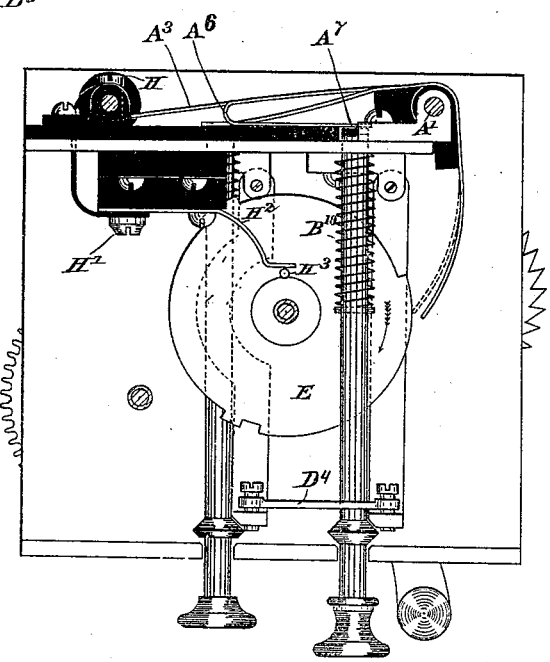
Figure 4:
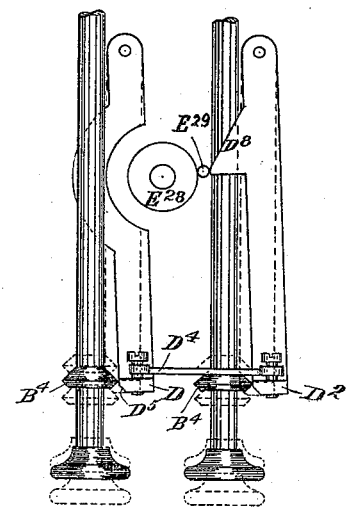
Figure 5:
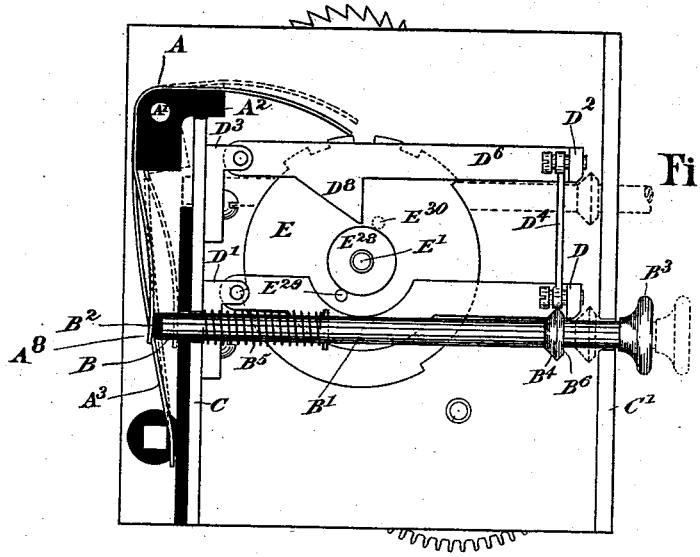
Figure 6:
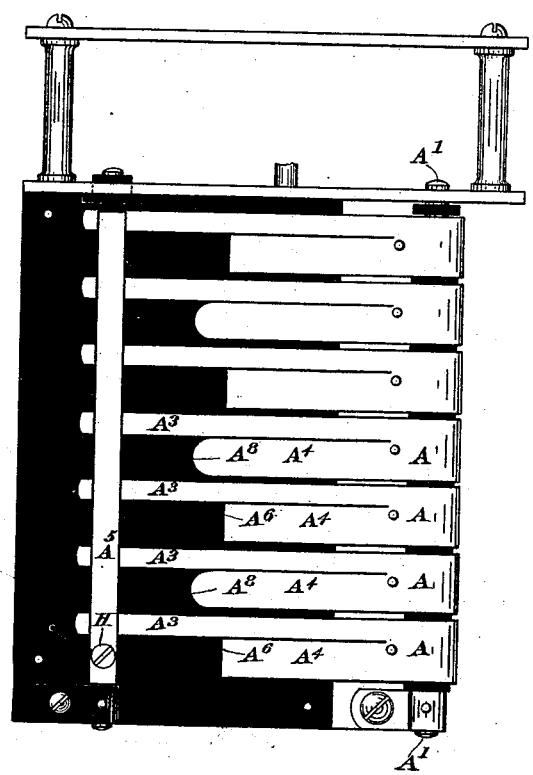
Figure 7:
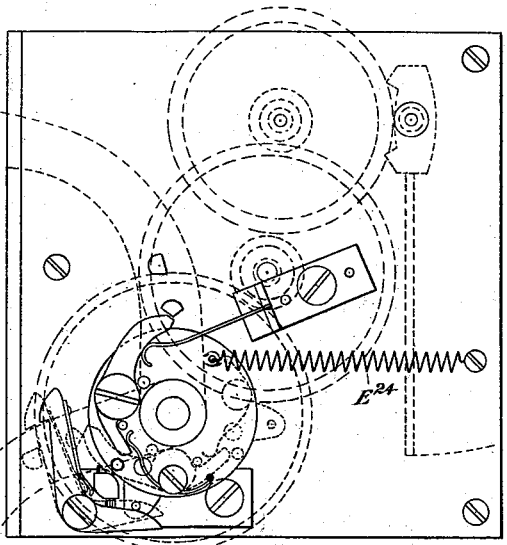
Figure 8:
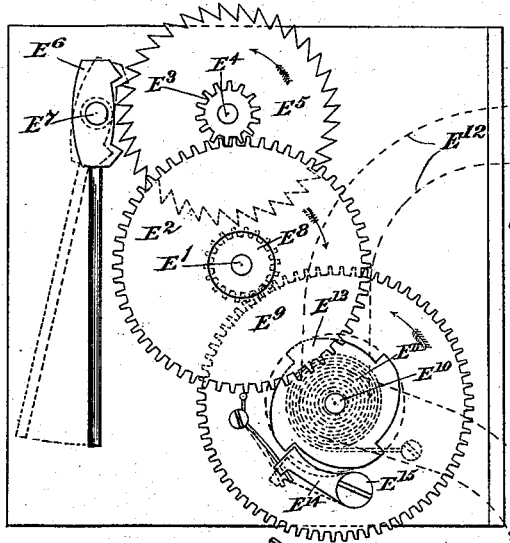
Figure 9:
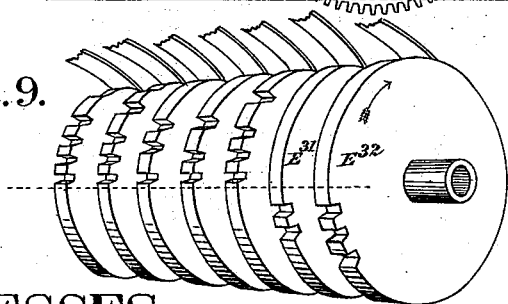
Figure 10:
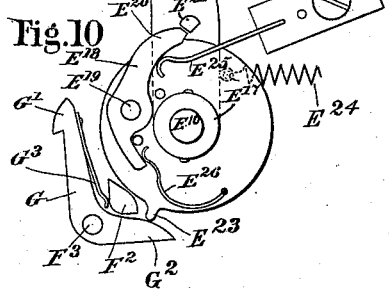

Figure 1. represents a front elevation of the device in which the buttons indicate the character of the different signals that may be transmitted by the machine while the lever for starting the mechanism into operation is shown in the right hand section of the figure. Fig. 2. represents a top view of the mechanism and also a double lever mechanism of which one of the levers is intended for effecting what is known as the non-interference principle of pull levers for electric signal boxes. Fig. 3. represents an end view of Fig. 2. looking toward the right. Fig. 4. shows a catch mechanism by means of which the contact springs are held down upon the circuit wheels until the completion of the signal, when the buttons are partly pushed in. Fig. 5. shows an end view of the push button mechanism, the latter being locked in and the contact spring down on the circuit wheel. It also shows the manner in which the catch mechanism holds the push button in while the contact springs are thus held down. Fig. 6. shows a back view of the device in which the contact springs are shown bearing against a contact bar to which one of the connecting wires is secured. Fig. 7. shows a side plan view of the wheel work of the train and also a non-interference mechanism for the pull lever. Fig. 8. shows a reversed side plan view of the train and ratchet wheel mechanism of the pull lever. Fig. 9. shows a multiple circuit wheel adapted to be used in connection with the contact springs. Figs. 10. 11. 12. and 13. show side views of the non-interference mechanism for the pull lever in the various positions through which it passes when a signal is being transmitted by the device.

A. A. A. represent a series of terminal contact levers or springs which are loosely pivoted upon the rod $A'$. but being insulated therefrom by means of the rubber blocks $A^2$. $A^2$ to which the springs are secured. The lower parts or power arms of the springs A. A. A. are each divided into two prongs or sections $A^3$. and $A^4$. of which $A^3$. extends down to the contact bar $A^5$. while the shorter part $A^4$. is adapted to receive the thrust of the end B. of the push rod $B'$. which has a sliding bearing through holes in the plates C. $C'$. of the machine. The extreme end of the push rod $B'$. is provided with rubber $B^2$. that the contact between the push rod $B'$. and of the contact spring A. may be an insulated one. The front end of the push rod is provided with a button $B^3$. upon which the nature of the signal to be given is imprinted. A conical sleeve $B^4$. is secured upon each push rod near its front end against which a drop bar D. is adapted to play when the push rod $B'$ is moved in or out. The drop bar D. is hinged to the back plate C. of the machine, by two lugs, one of which may be seen at $D'$. Another drop bar $D^2$. of similar shape as that of D. is hinged above the latter and in a like manner to the plate C. by means of two lugs, one of which is shown at $D^3$. The bars D. $D^2$. are connected together at their free ends by means of two links one of which $D^4$. may be seen in Fig. 4. so that a parallel motion may be established between the bars D. $D^2$. and having a range of motion as indicated in Fig. 4. The push rods are arranged in two rows one of which is above the other as indicated in Figs. 1 and 3. and the free ends of the drop bars D. $D^2$. extend along over the push rod in such a manner and in such a position as to rest upon the latter at all times in some one of the positions indicated in Figs. 3. 4. and 5. according as the push rods may be in their normal position, or else pushed in. A spring $B^5$ is secured upon each of the push rods which is adapted to throw the latter forward upon the completion of a signal. The front face $B^6$. of each of the conical sleeves upon the push rods is partly squared up so that when the drop bars fall down upon the push rods they will hold in any of the push rods that may have been pushed in as far as indicated Fig. 5. The drop bars retain their position by reason of gravity. The normal position of the drop bars and push rods is as indicated in Fig. 3. but when a push rod is pushed in the conical sleeve thereon causes the drop bar to rise up by reason of the beveled face $D^5$. as shown in Fig. 4. and to drop down again upon the push rod, outside of the conical sleeve $B^4$. After the push rod has been pushed in to its extreme limit as seen in Fig. 5. in which position the whole mechanism remains until the completion of the transmission of a signal when the drop bar mechanism will be lifted up again as will hereinafter be described, which releases the push rod mechanism, and the latter moves forward again to its normal position by the action of the spring $B^5$.

E. represents a multiple circuit wheel having a section to make contact with each of the contact terminal springs A. A. In the periphery of each of the sections, suitable notches are made corresponding to the breaks in the circuit representing the different signals which the machine is intended to transmit and similar in construction to the usual form of multiple circuit wheels. The circuit wheel E. is mounted upon the shaft $E'$. having the gear $E^2$. which is provided with a train consisting of pinion $E^3$. upon the shaft $E^4$. the pallet wheel $E^5$. which engages with the pallet $E^6$. which is mounted upon the shaft $E^7$. The shaft $E'$. is also provided with a pinion $E^8$. which engages with a wheel $E^9$. which is fitted loosely upon the shaft $E^{10}$. The shaft $E^{10}$. has a clock spring $E^{11}$. secured thereto which is adapted to be wound up by means of the lever $E^{12}$. A ratchet wheel $E^{13}$. is also secured to the shaft $E^{10}$. having four teeth and which are adapted to impinge against a pawl $E^{14}$. which is secured upon the wheel $E^9$. by means of the screw $E^{15}$.

The lever mechanism admits of an arc of movement of a little more than ninety degrees, its movement being limited in the slot in the front plate of the machine to that extent. The wheel $E^9$. and the pinion $E^8$. are in the proportion of four to one so that a quarter revolution of the wheel $E^9$. causes the shaft $E'$. and consequently the circuit wheel E. to make a complete revolution with every quarter revolution of the wheel $E^9$. Therefore every time the lever is drawn down as indicated in Fig. 7. and released, the ratchet wheel $E^{13}$. causes the wheel $E^9$. through the pawl $E^{14}$. to make a quarter revolution and consequently the circuit wheel E. to make a whole revolution and transmit a complete signal if a push button has been pushed in. The spring $E^{11}$. is in a state of tension at all times so as to carry the circuit wheel mechanism back with a reserved motive power to its normal position.

The object of the mechanism shown in detail in Figs. 10. 11. 12. and 13. is to prevent any interference with the regular transmission of a signal such as might be caused by holding down the lever. In this device the lever $E^{16}$. is loosely fitted upon the shaft $E^{10}$. while a flanged collar $E^{17}$ is rigidly secured to the shaft upon which collar a pawl $E^{18}$ is pivoted by the pivot $E^{19}$. the upper end $E^{20}$ of which is adapted to come against a pin $E^{21}$. in the lever $E^{16}$. so that when the latter is carried forward it causes the collar $E^{17}$. and consequently the shaft $E^{10}$. to make the necessary quarter revolution of the spring shaft as already described. A stud $F^2$. is secured to the plate $F'$. of the machine as is also an L shaped detent G. which is pivoted to the plate $F'$. upon the pivot $F^3$.

Figure 11:
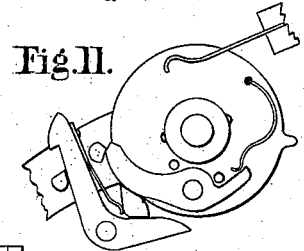
Figure 12:
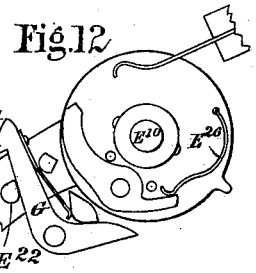
Figure 13:
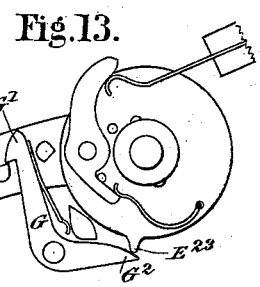

In Fig. 10. the lever $E^{16}$ is shown in its normal position. In Fig. 11. it is shown as having been drawn down so as to cause the pawl $E^{18}$. to come against the stud $F^2$. and the latter causes the pawl $E^{18}$. to be pushed inwardly and away from the pin $E^{21}$. and the collar being thus made free moves back to the position shown in Fig. 12. or in other words until its further motion is arrested by one of the teeth of the wheel $E^{13}$. coming against the pawl $E^{14}$. (see Fig. 8.) when the circuit wheel mechanism is slowly carried around on account of the pallet mechanism and a signal is regularly transmitted. It will be observed, however, that another pin $E^{22}$. in the lever $E^{16}$. passes below the shoulder $G'$. of the detent G. so that when the lever is released its upward motion is arrested by reason of the pin $E^{22}$. coming against the shoulder $G'$. as shown in Fig. 13. in which position it will remain until a projection $E^{23}$. on the periphery of the wheel $E^{17}$. comes against the lower end $G^2$. of the detent G. which causes the shoulder $G'$. of the detent to clear the pin $G^{22}$. and the lever then assumes its normal position, shown in Fig. 10. by reason of the tension of the spring $E^{24}$. (see Fig. 7.) which draws the lever up to its normal position. As the pin $E^{21}$. passes back over the outer surface of the pawl $E^{18}$. the latter becomes depressed to admit of this, but it resumes its normal position again when the lever $E^{16}$. regains its original position on account of the tension of the spring $E^{25}$. against it. Another spring $E^{26}$. which presses against the lower end of the pawl $E^{18}$. is for the purpose of keeping the latter clear of the pin $E^{21}$. while going from the position shown in Fig. 11. back to its normal position, the object of this being to keep the detent clear of the pin $E^{21}$ while the signal is being transmitted, so that if the lever $E^{16}$. became accidentally released the backward movement of the circuit wheel mechanism could not be prevented or a signal interfered with. The spring $G^3$. which is secured to the detent G. is for the purpose of throwing the end $G'$. forward so as to cause it to catch the pin $E^{22}$. of the lever $E^{16}$. when the latter is drawn down preparatory to giving a signal as has already been explained.

The object of the two levers $E^{12}$. and $E^{16}$. Fig. 2. is this:—Sometimes it is desirable to have the outer lever $E^{16}$. project through a case or box inclosing all of the other mechanism including the lever $E^{12}$, which is locked and the mechanism within accessible only to a police officer or an authorized person having a key for the same, so that the push button signals may be operative to such persons. Any person, however, can, by depressing the lever $E^{16}$, send in one signal which is a box number itself, and is usually understood in municipal signal systems as being the "citizen" call. Of course, even then the whole mechanism is inclosed by a sentry box or a large outside box having a lock and key arrangement,—the keys of which are held by certain citizens residing in the vicinity of the station. The front end $E^{27}$, of the lever $E^{12}$, as seen in Fig. 1, is spoon shaped, so as to render it more convenient of manipulation.

The mechanism for lifting the drop bar device will now be explained:—Each of the arms $D^6$, $D^7$, of the upper drop bar is provided with a spur $D^8$, which extends down below the drop bar so as to almost touch the hub $E^{28}$, of the circuit wheel E. The pin $E^{29}$, is fitted to the circuit wheel mechanism against the hub $E^{28}$, parallel with the shaft $E'$, between the two sections of the circuit wheel between which the arm $D^6$, of the drop bar $D^2$, is placed,—the arm $D^7$, of the drop bar having a similar pin mechanism. Now, whenever the shaft $E'$, makes a revolution in the transmission of the signal, it causes the pin $E^{29}$, to pass under the spur $D^8$, and makes the latter rise up so as to lift up the whole drop bar mechanism (the upper and lower bars being linked together) clear of the conical sleeve $B^4$, of the push rod that may have been pushed in to effect the proper spring contact necessary to make the signal operative. The edge of the spur $D^8$, against which the pin $E^{29}$, rubs is beveled so as to make the drop bar mechanism lift gradually, so as to reduce the resistance against the motor spring $E^{11}$, and thereby enable the latter to move the circuit wheel mechanism around to its normal position or starting point.

Fig. 4, shows the pin $E^{29}$, as having lifted the drop bar mechanism, and the push button mechanism is shown as having partly moved back to its normal position. The normal position of the pin $E^{29}$, is as indicated by the dotted lines $E^{30}$, shown in Fig. 5. That is, the circuit wheel mechanism nearly makes its whole revolution and thereby transmits its complete signal before the drop bar mechanism is lifted up by the pin $E^{29}$, so that the push button mechanism remains in during the transmission of the signal and the contact spring touches the circuit wheel until the signal is finished, when the drop bar mechanism is lifted and the push button moves out again just before the circuit wheel finishes its rotation. One of the push rods $B^7$, is shown as being longer than the others in Fig. 2, and its sleeve $B^8$, is shown as being conical on both sides. The object of this push rod is that in case a person should make a mistake in pushing a wrong push button for the signal desired, he could by pressing upon the button $B^9$, cause the drop bar mechanism to lift and release the locked in push rod. The sleeve $B^8$, having no flat seat like the sleeve on the other push rods cannot become caught by the drop bar as its front conical surface causes the drop bar to rise when the push rod moves out by reason of its retracting spring $B^{10}$. In Fig. 1, this button is designated by the blank push button $B^{11}$. The drop bar mechanism may, however, be operated so as to cause it to release the push rod by pressing in another push button carefully to the position shown in Fig. 4, then releasing it again when the button thus pressed will not itself become caught on account of its not having been pressed in far enough for the drop bar to drop in front of it as can be readily understood.

In Fig. 9, the circuit wheel is shown consisting of several sections,—two of which $E^{31}$, $E^{32}$, are intended for giving special signals after a box number has been given by some one of the other sections. This form of arranging the circuit wheel sections is desirable when the machine is intended to send out different box number signals and after the same shall have been completed to also give some special signal and to have the same indicated upon an electro-mechanical indicator like that for which a patent was granted to me on February 10, 1891, and numbered 445,991, of United States Letters Patents to which reference is hereby made.

When used in connection with a machine of this class it is necessary to have a special signal always come at the same interval of time after the last impulse of the box signal shall have been given no matter what the box number may be so that the box number and the special signal may both be indicated upon the drum mechanisms of such indicator machines. This is accomplished by having all the box number notches on the different sections of the wheel terminate upon the same line, and parallel to the axis of the wheel as indicated by the dotted line in Fig. 9, the special signal wheel notches coming after the box wheel notches and below the dotted line.

It will be observed by referring to Fig. 9, that the box number sections show the notches to a greater or lesser distance above the dotted line according as the number may have more or less notches. By this arrangement the device will commence giving a high box number like 13, for instance, sooner than it will signal box 12 when the lever has been depressed. After the device gives its first box number impulse, however, both the box signal and the special signal will be recorded in an orderly manner upon the drum mechanism of an indicator such as has been referred to.

When this service is required it is customary to push two buttons, as for instance referring to Fig. 1, by pushing the button marked "3" and the one marked "Ambulance" it would indicate upon the indicator that might be located at the stable where the ambulance wagon is stationed, that the ambulance was needed at box 3. By pushing a button marked "Wagon" would indicate that the patrol wagon was required, and so on.

When this service is installed, it is customary to have the signal device herein described located at the central police station and an indicator such as has been referred to located at the stable and both machines connected in an electric circuit.

The wheel shown in Fig. 9. is intended for a closed circuit, but if the wheel had projecting teeth instead of the notches shown, it would be adapted for an open circuit. The necessary special connections between the sections $E^{31}$, $E^{32}$ and the other sections of the wheel would, of course have to be made to make the device operative according as it might be an open or closed circuit wheel but this matter of connections can be readily understood without any demonstration or explanation.

In this specification, I have referred to the multiple circuit wheel as being a series of circuit wheels or as a single wheel having a series of sections, which of course, is practically the same thing and I desire it to be so understood.

In Fig. 6. the bar $A^5$, which makes contact with all the terminal springs has one of the circuit wires connected thereto. The other circuit wire may be connected to the outer case of the machine, see $H^4$. Fig. 1. or any other part of the machine and a circuit established through the circuit wheel shaft.

In Fig. 6. one of the circuit wires is shown connected to the screw H. and in Fig. 3. the same wire is shown as secured by means of the screw $H'$, to the spring $H^2$, which makes a contact against a pin $H^3$, in one of the circuit wheels, to close the circuit when the machine is at rest. In the form of contact spring herein shown it will be noticed that the spring by being split as shown in Figs. 5 and 6. gives the requisite tension upon the circuit wheel when the push rod is pushed in. When the push rod is withdrawn the long part $A^3$, of the spring furnishes the requisite tension to cause it to clear the circuit wheel as indicated by the dotted lines.

In Fig. 5. a contact spring is shown of such form as is adapted to receive the thrust of one of the lower push rods. In Fig. 3. the part of the spring against which an upper push rod is pressed is shown as being bent up again at $A^6$, so that its end $A^7$, may come against the upper push rod. Otherwise the construction of all the springs is alike.

$A^8$, represents the end of a contact spring against which a lower push rod strikes. The insulation $B^2$, on the end of each of the push rods of course prevents an electric contact between the spring and the push rod.

When made in the form shown in Fig. 1. the device is intended for transmitting signals from an outlying police signal station to the central office.

The operation of the device may be described as follows:—When a police officer desires to use the machine, it is only necessary for him to push in one of the buttons indicating the information he desires to transmit, pull the lever down and let go and the circuit wheel mechanism will then automatically transmit the necessary electric impulses over the circuit in which the signal receiving mechanism at the central station is placed, and which may consist of a register, bell, indicator or the like that may be adapted to receive the signal. When a button is thus pushed in, it remains locked in position by the drop bar mechanism as already described holding the contact spring down upon the circuit wheel until the completion of the signal after which it becomes released leaving the device ready for use again. Pulling the lever down alone without pressing in any of the buttons will cause the box number itself to be transmitted if a contact spring is made to rest permanently upon one of the circuit wheels. Any person having access to the lever alone may thus send in the box number which usually constitutes the "citizen's" call. When several officers are to make their report from the same box, each may be distinguished if he uses the same button at all times. As for instance one officer would always use the button marked "1," and another the button marked "2," &c. If an officer, however desires the patrol wagon or ambulance he uses the button marked "Wagon" or "Ambulance" as the case may be, and if the station is equipped with telephonic apparatus and he desires to hold telephonic communication with headquarters, the button marked "Telephone" is to be used. When the device is intended for other service, the circuit wheel is provided with suitable notches or teeth to meet the requirements and the nature of the signal given by each of the buttons can be indicated by the proper imprint thereon. By a proper arrangement of the notches upon the circuit wheel mechanism, two buttons may be pushed in at the same time and a signal can be given that will be different from that transmitted by either one when used separately.

When the device is intended to be used as a central office transmitter to transmit box numbers and special calls from the police office to the stable where the wagons are kept, each button with its corresponding circuit wheel is adapted to give a box number, while two or three of the buttons and circuit wheel mechanisms are adapted to give the special signals after the box number goes in. The spring $E^{11}$, and the train of wheel work that regulates the movement of the shaft $E'$, constitute the motor mechanism of the device. The terminal springs A. A. are loosely pivoted upon the rod $A'$, but insulated from the latter by means of the rubber blocks one of which is shown at $A^2$, the circuit being established through the lower section A³. of each of the terminal springs and the insulated bar A⁵. to which one of the circuit wires is connected, the other wire being connected to the outer case which makes the circuit through the circuit wheels to the contact springs, as has already been explained. The catch mechanism of the push rods is shown as consisting of a conical sleeve having a flat face in front of which the drop bar falls and thereby holds the push rod mechanism in during the transmission of a signal but any other kind of a projection upon the push rod that would have a beveled surface on one side and a straight face on the other, would serve the purpose as well.

Having thus described my invention, what I claim, and desire to secure by Letters Patent, is—

1. In combination with a sliding push rod mechanism of an electric signal device having a catch projection B⁴. a hinged drop bar D². adapted to engage with the push rod catch projection and to hold the push rod when pressed in, and having a lug D⁸, and a circuit wheel mechanism having a pin E²⁹. which is adapted to move against the lug D⁸. of the drop bar mechanism in its rotation and thereby lift the drop bar so as to cause the release of the push rod mechanism, substantially as described.

2. In combination with a circuit wheel E. a loosely pivoted terminal spring A. adapted to make contact therewith and a push rod B'. provided with an insulating substance B². that is adapted to impinge against the spring A. and cause the latter to make the contact with the wheel E. substantially as specified.

3. In combination with the shaft E'. of the circuit wheel mechanism, the flanged collar E¹⁷. which is secured thereto and which is provided with a loosely pivoted pawl E¹⁸. and the spring E²⁶. and having the projection E²³, the loosely pivoted detent G. having the shoulder G'. and the retracting spring G³., the stud F²., the spring E²⁵. for the pawl E¹⁸. and the lever E¹⁶. having a retracting spring E²⁴. and being provided with a pin E²¹. which is adapted to impinge against the end of the pawl E¹⁸. and to thereby cause the rotation of the shaft E². when the lever is depressed and also having a pin E²². by means of which the backward movement of the lever is arrested by being caught by the shoulder G'. of the detent G. until released by the projection E²³. of the collar E¹⁷. when it comes against the lower end G². of the detent G. and depresses the latter, substantially as described.

4. In combination with a signal circuit wheel, a contact lever therefor, having its power arm bifurcated, one prong thereof completing the electric circuit, and the other receiving the pressure, as from a push rod, for making contact, substantially as described.

5. In combination with a multiple signal circuit wheel consisting of parallel signal circuit disks, a circuit closer for each disk or section, detaining means adapted to hold any number of the circuit closers in their operative position, and an attachment carried by said circuit wheel operating said detaining means to release the circuit closers at the end of the revolution of the wheel, substantially as described.

6. The combination with a multiple signal circuit wheel, of circuit closers therefor, upper and lower push rods for the circuit closers, upper and lower detaining dogs for the push rods and links connecting the upper with the lower dogs, substantially as described.

7. The combination, with a multiple signal circuit wheel, of circuit closers therefor, push rods for the circuit closers, pivoted detaining dogs for the push rods and a bar uniting the free ends of all the dogs, whereby they move in unison, substantially as described.

8. The combination, with a plurality of upper and lower push rods, of detaining dogs for each push rod, a bar connecting the upper dogs, a bar connecting the lower dogs, and links joining the upper and lower dogs, substantially as described.

9. The combination with a movable detaining bar having a square face and a beveled face, of push rods, each having a squared shoulder and a beveled shoulder for engagement with the detaining bar, substantially as described.

10. The combination of a frame, upper and lower push rods therein, circuit closing levers loosely pivoted on the same shaft, the levers which engage the lower push rods having downwardly extending arms for contact therewith, and the others having a U-shaped arm for engaging the upper push rods, substantially as described.

11. The combination of a circuit wheel, a circuit closer therefor, and a detaining dog having a beveled shoulder by which it is raised by the circuit closer in its operation, and a beveled shoulder by which it is raised by the circuit wheel in its operation, substantially as described.

12. The push rod, having thereon an annular shoulder conical on one side and frusto-conical on the other, in combination with detaining means engaging with said shoulder, substantially as described.

13. In combination with the push rod having an annular shoulder provided with a sharp circumferential edge, the drop bar having its lower or engaging edge partly squared and partly beveled, substantially as described.

14. In combination with circuits and circuit closers, a plurality of push rods moving in different planes, and detaining dogs for the push rods, all united by links to move in unison, substantially as described.

15. The combination of a signal circuit wheel, a shaft in gear therewith, a lever loose on the shaft, a device carried by the shaft adapted to be engaged by the lever for rocking the shaft by the lever, a spring carried by the shaft tending to throw said device out of engagement with the lever, and a stationary spring tending to throw said device into engagement therewith at the initial position of the lever, substantially as described.

16. The combination of a signal circuit wheel, a shaft in gear therewith, motor mechanism therefor, a lever loose on the shaft, but adapted to rock the same through a discontinuously operative connection, and a detent engaging the lever at the end of its stroke, substantially as described.

17. The combination of a signal circuit wheel, a shaft geared thereto, motor mechanism therefor, a lever adapted to energize said motor mechanism, an engaging device carried by the shaft and engaging the lever, whereby the lever operates the shaft, means for automatically disengaging the shaft from the lever at the completion of the stroke of the latter, and a spring hook holding said lever when so disengaged, substantially as described.

18. The combination of a signal circuit wheel, a shaft geared thereto, motor mechanism therefor, a lever adapted to energize said motor mechanism and rocking said shaft, a detent for said lever acting at the completion of its stroke, and a projection carried by said shaft engaging said detent at or near the return movement of the shaft to release the lever, substantially as described.

THOMAS F. GAYNOR.

Witnesses:
MILT. V. BARLOW,
FRANK PARDON.